(12) United States Patent  (10) Patent No.: US 7,835,098 B2
Mukai et al.  (45) Date of Patent: Nov. 16, 2010

| (54) | AUTOMATIC GAIN CONTROL FOR MAGNETIC DISK-DRIVE PREAMPLIFIER | | |
|---|---|---|---|
| (75) | Inventors: | Hiroyuki Mukai, Kanagawa (JP); Hidetaka Kuroiwa, Kanagawa (JP) | |
| (73) | Assignee: | Texas Instruments Incorporated, Dallas, TX (US) | |
| ( * ) | Notice: | Subject to any disclaimer, the term of this patent is extended or adjusted under 35 U.S.C. 154(b) by 391 days. | |
| (21) | Appl. No.: | 12/128,235 | |
| (22) | Filed: | May 28, 2008 | |
| (65) | | Prior Publication Data | |
| | US 2009/0296259 A1 | Dec. 3, 2009 | |
| (51) | Int. Cl. G11B 5/09 (2006.01) | | |
| (52) | U.S. Cl. ...................................................... 360/46 | | |
| (58) | Field of Classification Search .................. 360/46, 360/67, 75, 68 See application file for complete search history. | | |
| (56) | | References Cited | |

U.S. PATENT DOCUMENTS

| 4,151,471 A | * | 4/1979 | Packard et al. .............. 455/224 |
|---|---|---|---|
| 5,818,656 A | | 10/1998 | Klaassen et al. |
| 5,831,888 A | | 11/1998 | Glover |
| 6,538,832 B1 | | 3/2003 | Ranmuthu et al. |
| 7,082,004 B2 | | 7/2006 | Kajiyama et al. |
| 7,271,651 B2 | | 9/2007 | Chen et al. |
| 7,274,523 B2 | | 9/2007 | Ozanoglu et al. |
| 7,613,975 B2 | * | 11/2009 | Jibry et al. .................. 714/746 |
| 2008/0100944 A1 | | 5/2008 | Matsui et al. |

* cited by examiner

*Primary Examiner*—Fred Tzeng
(74) *Attorney, Agent, or Firm*—Dawn V. Stephens; Wade James Brady, III; Frederick J. Telecky, Jr.

(57) ABSTRACT

One embodiment of the invention includes a preamplifier system for a magnetic disk-drive. The system comprises a read amplifier configured to generate a read signal corresponding to data that is read from a magnetic disk via a magneto-resistive (MR) read head. The system also comprises a gain control amplifier that is configured to amplify the read signal based on a digital gain value to generate an amplified read signal. The system further comprises a feed-forward automatic gain controller (AGC) configured to set the digital gain value based on an amplitude of the read signal.

27 Claims, 4 Drawing Sheets

AUTOMATIC GAIN CONTROL FOR MAGNETIC DISK-DRIVE PREAMPLIFIER

TECHNICAL FIELD

This invention relates to electronic circuits, and more specifically to automatic gain control for a magnetic disk-drive preamplifier.

BACKGROUND

As computer hardware and software technology continues to progress, the need for larger and faster mass storage devices for storing computer software and data continues to increase. Electronic databases and computer applications such as multimedia applications require large amounts of disk storage space.

To meet these ever increasing demands, the hard disk drive (HDD) continues to evolve and advance. Some of the early disk drives had a maximum storage capacity of five megabytes and used fourteen inch platters, whereas today's HDDs are commonly over one gigabyte and use 3.5 inch platters. Advances in the amount of data stored per unit of area, or areal density, have dramatically accelerated. For example, in the 1980's, areal density increased about thirty percent per year while in the 1990's annual areal density increases have been around sixty percent. Areal density may be increased by increasing the rate at which data may be stored and retrieved. The cost per megabyte of an HDD is inversely related to its areal density.

In general, mass storage devices and systems, such as HDDs, include a magnetic storage media, such as rotating disks or platters, a spindle motor, read/write heads, an actuator, a pre-amplifier, a read channel, a write channel, a servo controller, a memory, and control circuitry to control the operation of the HDD and to properly interface the HDD to a host or system bus. The read channel, write channel, servo controller, and memory may all be implemented as one integrated circuit that is referred to as a data channel. The control circuitry often includes a microprocessor for executing control programs or instructions during the operation of the HDD.

An HDD performs write, read, and servo operations when storing and retrieving data. A typical HDD performs a write operation by transferring data from a host interface to its control circuitry. The control circuitry then stores the data in a local dynamic random access memory (DRAM). A control circuitry processor schedules a series of events to allow the information to be transferred to the disk platters through a write channel. The read/write heads are moved to the appropriate track and sector. Finally, the HDD control circuitry transfers the data from the DRAM to the sector using the write channel. A sector generally has a fixed data storage capacity, such as 512 bytes of user data per sector. A write clock controls the timing of a write operation in the write channel. The write channel may encode the data so that the data can be more reliably retrieved later.

In a read operation, the appropriate sector to be read is located and data that has been previously written to the disk is read. A read/write head senses the changes in the magnetic flux of the disk platter and generates a corresponding analog read signal. The read channel receives the analog read signal, conditions the signal, and detects "zeros" and "ones" from the signal. The read channel conditions the signal by amplifying the read signal, to an appropriate level using an automatic gain control circuit, such as can be included in a disk-drive preamplifier. The read channel then filters the signal, to eliminate unwanted high frequency noise, equalizes the channel, detects "zeros" and "ones" from the signal, and formats the binary data for the control circuitry. The binary or digital data is then transferred from the read channel to the control circuitry and is stored in the DRAM. The processor then communicates to the host that data is ready to be transferred. A read clock controls the timing of a read operation in the read channel. The goal during a read operation is to accurately retrieve the data with the lowest bit error rate (BER) in the noisiest environment.

The goal of the automatic gain control circuit during a read operation is to generate an appropriate output signal from the associated preamplifier so that the read signal may be efficiently and accurately analyzed by the read channel. For example, if the amplitude of the output signal is too high, the gain is reduced, and if the amplitude of the output signal is too low, the gain is increased. However, as the speed and storage capacity of HDD systems improves, the variation of the resistance in the magneto-resistive (MR) read head and the variation of the MR read head signal amplitude may become wider due to the use of more sensitive circuit elements. In contrast, the input dynamic range of the read channel device may be narrower due to the use of lower voltage processing to achieve higher performance. As a result, there can be a dynamic range mismatch between the output of the preamplifier and the input of the read channel device.

SUMMARY

One embodiment of the invention includes a preamplifier system for a magnetic disk-drive. The system comprises a read amplifier configured to generate a read signal corresponding to data that is read from a magnetic disk via a magneto-resistive (MR) read head. The system also comprises a gain control amplifier that is configured to amplify the read signal based on a digital gain value to generate an amplified read signal. The system further comprises a feed-forward automatic gain controller (AGC) configured to set the digital gain value based on an amplitude of the read signal.

Another embodiment of the invention includes a method for controlling gain of a preamplifier system. The method comprises initiating an automatic gain control calculation period and reading a data signal from a magnetic disk via an MR read head. The method also comprises determining a peak-amplitude of the data signal throughout the automatic gain control calculation period. The method also comprises setting a digital gain value for a gain control amplifier at a conclusion of the automatic gain control calculation period based on the determined peak-amplitude of the data signal, and amplifying the data signal based on the digital gain value.

Another embodiment of the invention includes a preamplifier system for a magnetic disk-drive. The system comprises means for reading a data signal from a magnetic disk. The system also comprises means for amplifying the data signal based on a digital gain value to generate an amplified data signal. The system further comprises means for setting the digital gain value based on an amplitude of the data signal.

Another embodiment of the invention includes an automatic gain control system. The system comprises a gain control amplifier that is configured to amplify an analog data signal based on a digital gain value to generate an amplified analog data signal. The system also comprises a feed-forward automatic gain controller (AGC) configured to set the digital gain value. The feed-forward AGC comprises a full-wave detector configured to generate a peak-amplitude signal associated with the magnitude of the analog data signal. The feed-forward AGC also comprises a low-pass filter (LPF)

configured to generate a filtered version of the peak-amplitude signal having gradual magnitude transitions in response to magnitude transitions of the peak-amplitude signal. The feed-forward AGC further comprises a latch circuit configured to latch the digital gain value to the gain control amplifier based on an amplitude of the filtered version of the peak-amplitude signal.

DETAILED DESCRIPTION

The invention relates to electronic circuits, and more specifically to automatic gain control for a magnetic disk-drive preamplifier. A preamplifier system includes a magneto-resistive (MR) read head that reads data from a magnetic disk. The data can be provided as a read signal that is generated from a read amplifier that is coupled to the MR read head. The read signal can be provided to a gain control amplifier that can apply a digital gain value to the read signal to generate a preamplifier output signal. The preamplifier system can also include an automatic gain controller (AGC) circuit that is configured to set the digital gain value based on an amplitude of the read signal. Thus, the AGC circuit can be arranged in a feed-forward configuration.

The AGC circuit can include a full-wave detector that is configured to generate a peak-amplitude signal that corresponds to a peak-amplitude of the read signal. The peak-amplitude signal can be provided to a low-pass filter (LPF) that is configured to filter the peak-amplitude signal to provide gradual transitions of the peak-amplitude signal in response to transitions of the magnitude of the peak-amplitude signal. The filtered peak-amplitude signal is provided to a level comparator that provides the digital gain value based on the magnitude of the filtered peak-amplitude signal. As an example, the digital gain value can be based on magnitude thresholds associated with the peak-amplitude signal. The digital gain value is provided to a latch circuit that latches the digital gain value to the gain control amplifier at the end of an automatic gain control calculation period. As an example, a timing signal can switch to a first logic-state to activate the full-wave detector to initiate the automatic gain control calculation period, and can switch to a second logic-state to latch the latch circuit to end the automatic gain control calculation period. Thus, the gain for the preamplifier is set to amplify the read signal to be processed by a read channel device.

Figure 1:
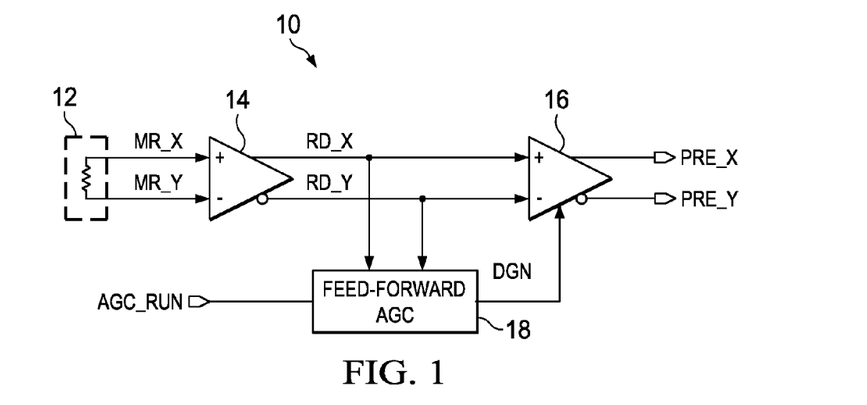
FIG. 1 illustrates an example of a preamplifier system in accordance with an aspect of the invention.

FIG. 1 illustrates an example of a preamplifier system 10 in accordance with an aspect of the invention. The preamplifier system 10 can be implemented in a magnetic disk-drive system, such that the preamplifier system 10 can be implemented to read data from a magnetic disk (not shown) via a magneto-resistive (MR) read head 12. As an example, the preamplifier system 10 can be implemented in a hard-drive system or in a peripheral disk-drive system.

In the example of FIG. 1, the data that is read from the magnetic disk is a differential signal MR_X and MR_Y. The differential signal MR_X and MR_Y is provided to a read amplifier 14. The read amplifier 14 can be a first stage amplifier that can amplify and/or condition the differential signal MR_X and MR_Y. The read amplifier 14 can thus generate a differential read signal RD_X and RD_Y corresponding to the data that is read from the magnetic disk. The read signal RD_X and RD_Y is provided to a gain control amplifier (i.e., variable gain amplifier) 16. The gain control amplifier 16 is configured to amplify the read signal RD_X and RD_Y by a digital gain value to generate a differential output signal PRE_X and PRE_Y. The output signal PRE_X and PRE_Y can thus be provided to a read channel device (not shown) that can process the output signal PRE_X and PRE_Y to determine the data on the magnetic disk.

The preamplifier system 10 also includes a feed-forward automatic gain controller (AGC) 18. The feed-forward AGC 18 receives the read signal RD_X and RD_Y as an input and generates a digital gain signal DGN as an output that is provided to the gain control amplifier 16. The feed-forward AGC 18 thus sets the digital gain value, as provided in the digital gain signal DGN, to the gain control amplifier 16 to amplify the read signal RD_X and RD_Y. The feed-forward AGC 18 can set the digital gain value based on the magnitude of the read signal RD_X and RD_Y during an automatic gain control calculation period.

In the example of FIG. 1, the feed-forward AGC 18 receives a timing signal AGC_RUN that can initiate the automatic gain control calculation period. As an example, the automatic gain control calculation period can be initiated upon power-up of the preamplifier system and/or in response to a calibration command that is received from a processor or disk-drive controller (not shown). Therefore, the feed-forward AGC 18 can monitor a peak-amplitude of the read signal RD_X and RD_Y during the automatic gain control calculation period. As such, a digital representation of a final, filtered peak-amplitude of the read signal RD_X and RD_Y can be latched at the conclusion of the automatic gain control calculation period as the digital gain signal DGN.

Because the feed-forward AGC 18 is configured to monitor the read signal RD-X and RD_Y to set the digital gain value to amplify the read signal RD_X and RD_Y, the feed-forward AGC 18 is arranged in a feed-forward configuration, as opposed to a feedback configuration. Therefore, the feed-forward AGC 18 can exhibit a much more stable frequency response relative to a feedback configuration which could be bandwidth limiting. In addition, the output signal PRE_X and PRE_Y can have a wider range of amplitudes than the read signal RD_X and RD_Y. Therefore, because the read signal RD_X and RD_Y is monitored, as opposed to the output signal PRE_X and PRE_Y, the feed-forward AGC 18 can be implemented on a smaller scale than a feedback configuration based on monitoring the smaller range of amplitudes of the read signal RD_X and RD_Y. Furthermore, because the read signal RD_X and RD_Y is monitored by the feed-forward AGC 18 throughout the automatic gain control calculation period, gain selection bits, which can require a complicated control algorithm, need not be provided to the preamplifier system 10 to support a narrow dynamic range of the associated read channel device.

It is to be understood that the preamplifier system 10 is not limited to the example of FIG. 1. As an example, the read amplifier 14 may not be required, in that the differential signal MR_X and MR_Y can be provided to the gain control amplifier 16 and the feed-forward AGC 18 directly. In addition, as described in greater detail with reference to the example of FIG. 4 below, additional components can be included in the preamplifier system 10, such as additional gain stages and/or additional read channels. Accordingly, the preamplifier system 10 can be configured in any of a variety of ways.

Figure 2:
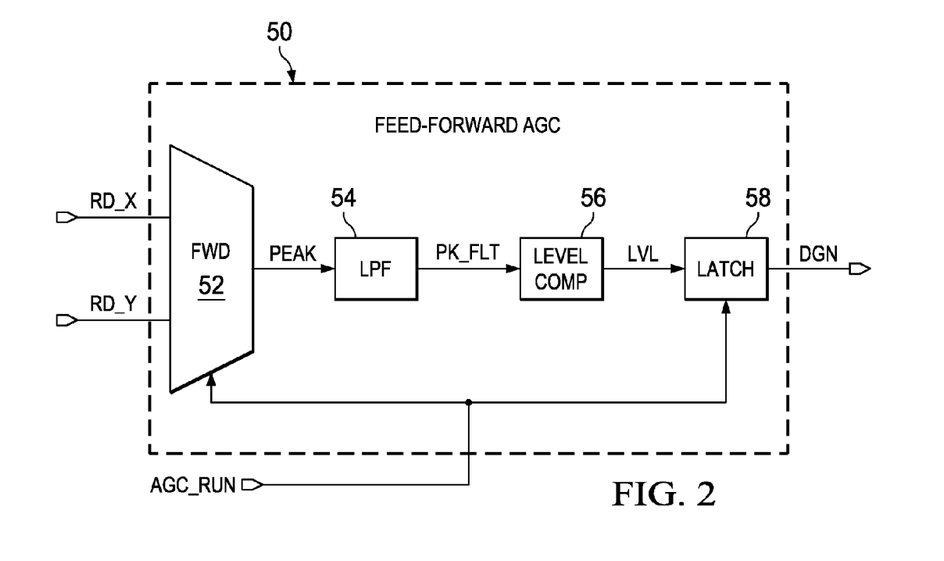
FIG. 2 illustrates an example of a feed-forward automatic gain controller in accordance with an aspect of the invention.

FIG. 2 illustrates an example of a feed-forward AGC 50 in accordance with an aspect of the invention. The feed-forward AGC 50 can be configured substantially similar to the feed-forward AGC 18 in the example of FIG. 1. As such, reference is to be made to the example of FIG. 1 in the following description of the example of FIG. 2.

The feed-forward AGC 50 includes a full-wave detector (FWD) 52 that receives the read signal RD_X and RD_Y as inputs. The FWD 52 is configured to generate a peak-amplitude signal PEAK that corresponds to a peak-amplitude of the read signal RD_X and RD_Y. Specifically, because the read signal RD_X and RD_Y are AC signals, the peak-amplitude signal PEAK can have a magnitude that corresponds to a peak-to-peak amplitude of the read signal RD_X and RD_Y. The FWD 52 provides the peak-amplitude signal PEAK to a low-pass filter (LPF) 54. The LPF 54 is configured to filter the peak-amplitude signal PEAK to generate a signal PK_FLT. As an example, the LPF 54 can be configured as an inductor. Therefore, the signal PK_FLT corresponds to the peak-amplitude signal PEAK, except that the signal PK_FLT provides gradual transitions in magnitude in response to changes in magnitude of the peak-amplitude signal PEAK.

The signal PK_FLT is provided to a level comparator 56. As an example, the level comparator 56 can include comparator circuits configured to compare the level comparator 56 with respective predetermined threshold magnitudes. The predetermined threshold magnitudes can be pre-programmed and/or can be programmable, and can be associated with the digital gain values. Specifically, the level comparator 56 is configured to provide a signal LVL that corresponds to a digital representation of the magnitude of the signal PK_FLT at a given time. The digital representation in the signal LVL can thus be based on the magnitude of the signal PK_FLT relative to the predetermined threshold magnitudes. The digital representation in the signal LVL can therefore correspond to an appropriate digital gain value, such as based on an inverse relationship.

The signal LVL is provided to a latch circuit 58. The latch circuit 58 is configured to latch the signal LVL to generate the digital gain signal DGN, such as at the conclusion of the automatic gain control calculation period. In the example of FIG. 2, the timing signal AGC_RUN is provided to both the FWD 52 and the latch circuit 58. For example, the timing signal AGC_RUN can be a digital signal that is asserted (i.e., switched to logic-high state) to initiate the automatic gain control calculation period. Specifically, the timing signal AGC_RUN can be asserted to activate the FWD 52 to begin generating the peak-amplitude signal PEAK based on the magnitude of the read signal RD_X and RD_Y. Thus, the timing signal can be de-asserted (i.e., switched to logic-low state) to end the automatic gain control calculation period. Specifically, the timing signal AGC_RUN can be de-asserted to activate the latch circuit 58 to latch the instant value of the signal LVL as the digital gain signal DGN.

The digital gain signal DGN can thus be provided to the gain control amplifier 16 to set the digital gain value of the gain control amplifier 16 in amplifying the read signal RD_X and RD_Y. As an example, the digital gain value can have an inverse relationship with the digital gain signal DGN, such that the gain control amplifier 16 can apply the inverse relationship to the digital gain value in response to the inverse relationship with the digital gain signal DGN. Specifically, because the signal LVL has a digital magnitude that is proportional with the magnitude of the signal PK_FLT, the gain control amplifier 16 may apply less gain to the read signal RD_X and RD_Y to provide decreasing magnitudes of the output signal PRE_X and PRE_Y in response to increasing magnitudes of the read signal RD_X and RD_Y. As another example, the level comparator 56 can provide the inverse relationship, such that the signal LVL can have a digital value that is inversely proportional to the magnitude of the signal PK_FLT. Accordingly, the feed-forward AGC 50 can be configured in any of a variety of ways to provide the appropriate digital gain value to the gain control amplifier 16 via the digital gain signal DGN based on monitoring the magnitude of the read signal RD_X and RD_Y throughout the automatic gain control calculation period.

Figure 3:
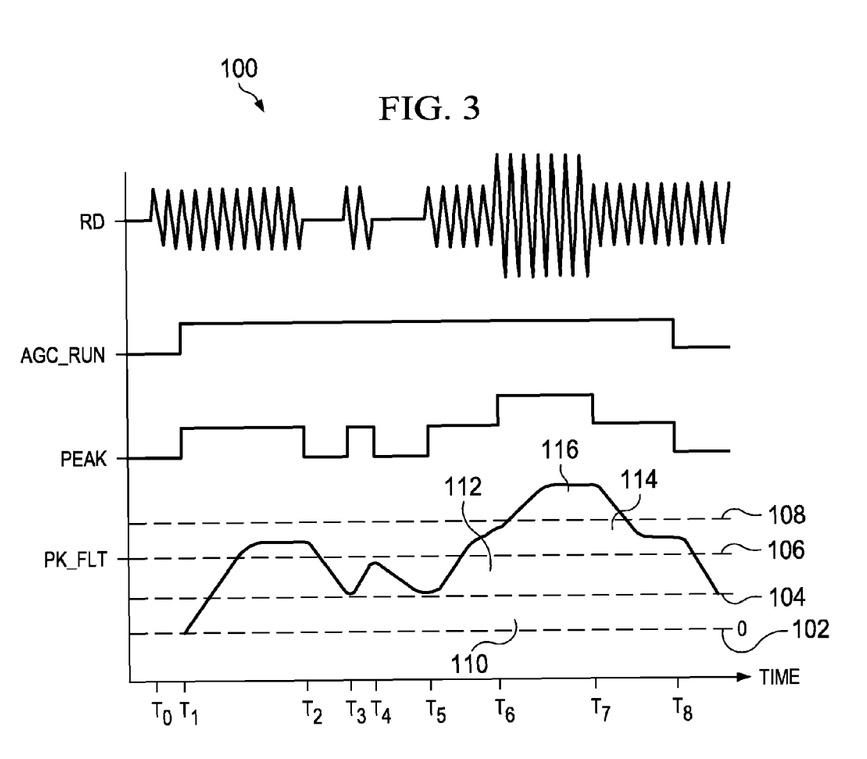
FIG. 3 illustrates an example of a timing diagram of a preamplifier system in accordance with an aspect of the invention.

FIG. 3 illustrates an example of a timing diagram 100 of the preamplifier system 10 in accordance with an aspect of the invention. The timing diagram 100 plots the read signal RD, the timing signal AGC_RUN, the peak-amplitude signal PEAK, and the signal PK_FLT versus time. In the example of FIG. 3, the differential read signal RD_X and RD_Y are collectively demonstrated in a single-ended representation as the read signal RD. Because the timing diagram 100 corresponds to the operation of the preamplifier system 10, reference is to be made to the examples of FIGS. 1 and 2 in the following description of the example of FIG. 3.

At a time $T_0$, the read signal RD is demonstrated as oscillating, such as based on the MR read head 12 reading data from the magnetic disk. As an example, the data being read can be dummy data that is read at a power-up or in response to a calibration command. At a time $T_1$, the timing signal AGC_RUN is asserted to initiate the automatic gain command calculation period. As an example, the timing signal AGC_RUN can be provided to the FWD 52 to activate the FWD 52. In response, the peak-amplitude signal PEAK increases magnitude to correspond to a peak-amplitude of the read signal RD. Accordingly, based on filtering provided by the LPF 54, the signal PK_FLT begins to gradually increase.

In the example of FIG. 3, the timing diagram 100 demonstrates a zero magnitude at 102, a first magnitude threshold at 104, a second magnitude threshold at 106, and a third magnitude threshold at 108. As an example, the magnitude thresholds 104, 106, and 108 can be the predetermined magnitude thresholds that are set in the level comparator 56. Therefore, the level signal LVL can correspond to respective digital magnitude states based on the magnitude of the signal PK_FLT relative to the magnitude thresholds 104, 106, and 108. Specifically, the timing diagram 100 demonstrates a first state of the signal LVL at 110 between the zero magnitude 102 and the first magnitude threshold 104, a second state of the signal LVL at 112 between the first magnitude threshold 104 and the second magnitude threshold 106, a third state of the signal LVL at 114 between the second magnitude threshold 106 and the third magnitude threshold 108, and a fourth state of the signal LVL at 116 above the third magnitude threshold 108.

Subsequent to the time $T_1$, the signal PK_FLT increases in magnitude gradually from the zero magnitude 102 to a substantially constant magnitude between the first and second magnitude thresholds 104 and 106. Thus, at a time $T_2$, the signal LVL is at the third state 114. Also at the time $T_2$, the read signal RD decreases to a peak-amplitude of approximately zero. In response, the peak-amplitude signal PEAK decreases in magnitude to approximately zero, as well. Accordingly, the signal PK_FLT begins to decrease gradually in magnitude from the substantially constant magnitude in the third state 114 of the signal LVL below the second magnitude threshold 106 to the second state 112 of the signal LVL.

At a time T₃, the signal PK_FLT decreases to a magnitude that is approximately equal to the first threshold 104. Also at the time T₃, the read signal RD is again demonstrated as oscillating, such as based on the MR read head 12 reading data from the magnetic disk. In response, the peak-amplitude signal PEAK increases magnitude to correspond to a peak-amplitude of the read signal RD. Accordingly, the signal PK_FLT begins to gradually increase. At a time T₄, the read signal RD again decreases to a peak-amplitude of approximately zero. In response, the peak-amplitude signal PEAK decreases in magnitude to approximately zero, as well. Therefore, at the time T₄, the signal PK_FLT begins to decrease gradually again.

At a time T₅, the read signal RD is again demonstrated as oscillating. In response, at the time T₅, the peak-amplitude signal PEAK increases magnitude to correspond to a peak-amplitude of the read signal RD. Accordingly, the signal PK_FLT again begins to gradually increase. Specifically, the signal PK_FLT increases to a magnitude that is greater than the second magnitude threshold 106. Therefore, the signal LVL changes from the second state 112 to the third state 114 subsequent to the time T₅. At a time T₆, the read signal RD increases to a greater amplitude. In response, the peak-amplitude signal PEAK increases in magnitude to correspond to the greater peak-amplitude of the read signal RD. Therefore, at the time T₆, the signal PK_FLT begins to increase gradually even further to a magnitude that is greater than the third magnitude threshold 108. Accordingly, the signal LVL switches from the third state 114 to the fourth state 116 subsequent to the time T₆.

At a time T₇, the read signal RD decreases in amplitude, such as approximately equal to the magnitude beginning at the times T₀, T₃, and T₅. In response, at the time T₇, the peak-amplitude signal PEAK decreases magnitude to correspond to the reduced peak-amplitude of the read signal RD. Accordingly, the signal PK_FLT again begins to gradually decrease. Specifically, the signal PK_FLT decreases to a magnitude that is less than the third magnitude threshold 108. Therefore, the signal LVL changes from the fourth state 116 to the third state 114 subsequent to the time T₇. At a time T₈, the timing signal AGC_RUN is de-asserted, thus concluding the automated gain control calculation period. Therefore, the latch circuit 58 latches the current state of the signal LVL, which is the third state 114, as the digital gain signal DGN. Accordingly, a digital gain value corresponding to the third state 114 is set at the gain control amplifier 16 to amplify the read signal RD_X and RD_Y. Also, as demonstrated in the example of FIG. 3, at the time T₈, the peak-amplitude signal PEAK decreases to a magnitude of approximately zero based on the FWD 52 being deactivated by the timing signal AGC_RUN. The signal PK_FLT begins to gradually decrease in response subsequent to the time T₈.

It is to be understood that the timing diagram 100 is demonstrated as a substantially ideal timing diagram. Specifically, magnitude increases and decreases of the signals in the timing diagram 100 may not be to scale relative to each other, and may have a defined slope that is not demonstrated in the example of FIG. 3. In addition, the preamplifier system 10 is not limited to the three magnitude thresholds 104, 106, and 108 that are demonstrated in the example of FIG. 3, but could have more or less depending on the number of desired states of the signal LVL, and thus the digital gain signal DGN. As another example, the timing signal AGC_RUN could be implemented only to define a time to latch the signal LVL, such that the FWD 52 is not activated by the timing signal AGC_RUN. Therefore, the peak-amplitude signal PEAK can substantially always track the peak-amplitude of the read signal RD. Furthermore, the preamplifier system 10 is not limited to latching the signal LVL at the conclusion of the automatic gain control calculation period, but could have any of a number of algorithms to determine and set the appropriate gain to the gain control amplifier 16, such as an averaging algorithm of the signal PK_FLT through the duration of the automatic gain control calculation period. Accordingly, the preamplifier system 10 can be configured in any of a variety of ways.

Figure 4:
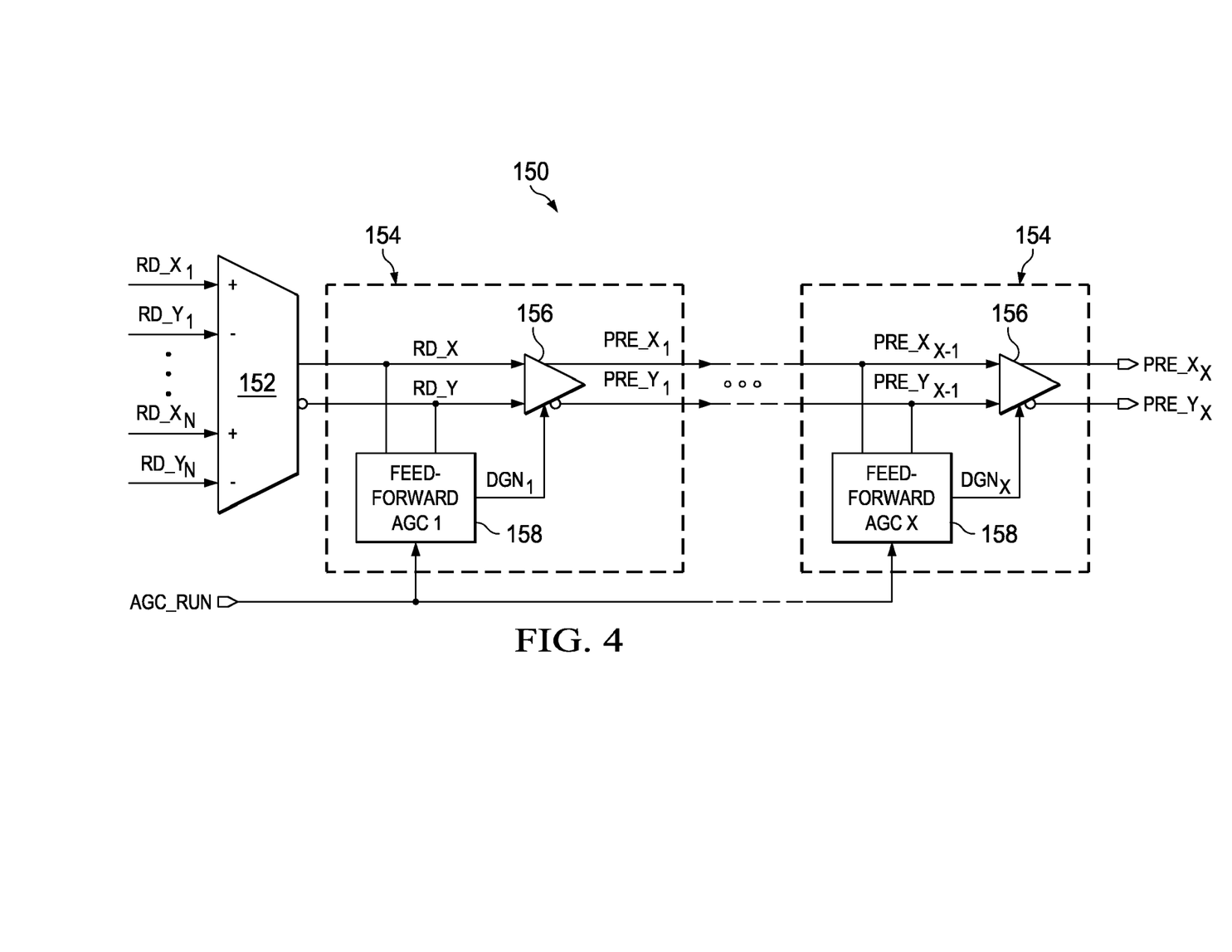
FIG. 4 illustrates another example of a preamplifier system in accordance with an aspect of the invention.

FIG. 4 illustrates another example of a preamplifier system 150 in accordance with an aspect of the invention. The preamplifier system 150 can be implemented in a magnetic disk-drive system, such as a hard-disk drive (HDD) system, such that the preamplifier system 150 can be implemented to read data from a magnetic disk (not shown) via an MR read head (not shown).

In the example of FIG. 4, the data that is read from the magnetic disk is demonstrated being generated on a plurality of channels. Specifically, a plurality N of differential read signals RD_X and RD_Y are demonstrated, where N is an integer that is greater than one. As an example, each of the read signals RD_X and RD_Y can be generated from a respective read amplifier (not shown), such as the read amplifier 14 in the example of FIG. 1, such that the read signals RD_X and RD_Y correspond to the data that is read from the magnetic disk. The read signals RD_X and RD_Y are provided to a multiplexer 152 that is configured to select one of the read signals RD_X and RD_Y at a given time, such as in response to a selection signal that is provided from a processor or disk-drive controller. Therefore, the selected one of the read signals RD_X and RD_Y can be amplified by the preamplifier system 150 and provided to a read channel device (not shown) for processing.

The preamplifier system 150 includes a plurality X of gain stages 154, where X is an integer greater than one. Each of the plurality of gain stages 154 includes a gain control amplifier 156 and a feed-forward AGC 158. The gain control amplifier 156 of the first of the gain stages 154 is configured to amplify the read signal RD_X and RD_Y that is output by the multiplexer 152 by a digital gain value to generate a differential first stage output signal PRE_X₁ and PRE_Y₁. The digital gain value can be set by the first feed-forward AGC 158, demonstrated as Feed-Forward AGC 1 in the example of FIG. 4, based on monitoring the peak-amplitude of the selected read signal RD_X and RD_Y during an automatic gain control calculation period, as defined by a timing signal ACG_RUN, similar to as described above in the examples of FIGS. 1 through 3.

The gain control amplifier 156 of each of the additional gain stages 154 is configured to amplify the output signal PRE_X and PRE_Y that is output by the previous gain stage 154 by a digital gain value to generate a differential next stage output signal PRE_X and PRE_Y. The digital gain value can be set by the respective feed-forward AGC 158, similar to as described above in the examples of FIGS. 1 through 3. Therefore, each of the gain stages 154 can control the magnitude of the respective cumulative output signal PRE_X and PRE_Y, up to the $X^{th}$ gain stage 154. The $X^{th}$ gain stage 154 thus amplifies the output signal $PRE\_X_{X-1}$ and $PRE\_Y_{X-1}$ that is output by the previous gain stage 154 by a digital gain value to generate a final output signal $PRE\_X_X$ and $PRE\_Y_X$. The final output signal $PRE\_X_X$ and $PRE\_Y_X$ is thus provided to the read channel device for processing of the data that is read from the magnetic disk.

It is to be understood that the preamplifier system 150 is not intended to be limited to the example of FIG. 4. As an example, it is to be understood that the gain stages 154 may not all be configured substantially the same, but that one or more of the gain stages 154 could incorporate other types of gain stages, such as a feedback configuration. As another example, the timing signal AGC_RUN can be configured to set different automatic gain control calculation periods for each of the gain stages 154. As an example, all of the gain stages 154 could have a concurrent automatic gain control calculation period. As such, asserting the timing signal AGC_RUN can activate all of the feed-forward AGCs 158 substantially concurrently and de-asserting the timing signal AGC_RUN can latch the respective signal LVL as the digital gain signal DGN substantially concurrently. As another example, the gain stages 154 could have sequential automatic gain control calculation periods. As such, the timing signal AGC_RUN can activate the feed-forward AGCs 158 and latch the digital gain signals DGN in a sequence beginning with the first of the gain stages 154. As a result, the digital gain value of the gain control amplifier 156 of each of the gain stages is set before the feed-forward AGC 158 of the next gain stage 154 in the sequence is activated. Accordingly, the preamplifier system 150 can be configured in any of a variety of ways.

Figure 5:
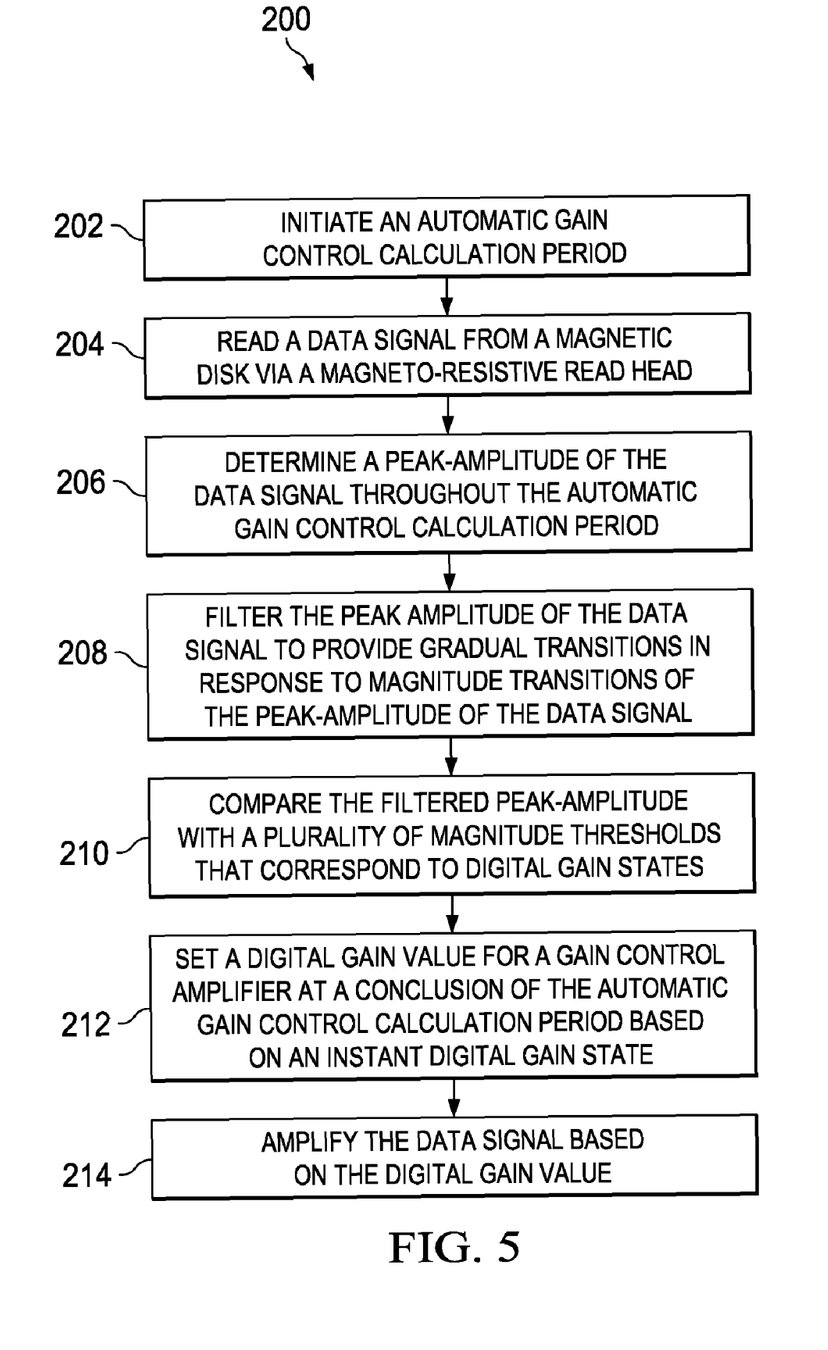
FIG. 5 illustrates an example of a method for controlling gain of a preamplifier in accordance with an aspect of the invention.

In view of the foregoing structural and functional features described above, certain methods will be better appreciated with reference to FIG. 5. It is to be understood and appreciated that the illustrated actions, in other embodiments, may occur in different orders and/or concurrently with other actions. Moreover, not all illustrated features may be required to implement a method.

FIG. 5 illustrates an example of a method 200 for controlling gain of a preamplifier in accordance with an aspect of the invention. At 202, an automatic gain control calculation period is initiated. The automatic gain control calculation period can be initiated based on a digital timing signal, such as based on a logic-state transition of the digital timing signal. At 204, a data signal is read from a magnetic disk via an MR read head. The data signal can correspond to dummy data that is read during the automatic gain control calculation period, such as read to calibrate the preamplifier system. The data signal could be conditioned and/or amplified via a read amplifier.

At 206, a peak-amplitude of the data signal is determined throughout the automatic gain control calculation period. The peak-amplitude of the data signal can be tracked based on a peak-amplitude signal that is generated by a full-wave detector in a feed-forward AGC. At 208, the peak-amplitude of the data signal is filtered to provide gradual transitions in response to magnitude transitions of the peak-amplitude of the data signal. The filtering can occur based on an LPF. At 210, the filtered peak-amplitude is compared with a plurality of magnitude thresholds that correspond to digital gain states. The comparison can be based on a level comparator in the feed-forward AGC that sets a digital state of an output signal based on the magnitude of the filtered peak-amplitude relative to the plurality of magnitude thresholds.

At 212, a digital gain value is set for a gain control amplifier at a conclusion of the automatic gain control calculation period based on an instant digital gain state. The digital gain value can have an inverse proportional relationship relative to the instant digital gain state. The digital gain state can be latched by a logic-state transition of the timing signal to end the automatic gain control calculation period. At 214, the data signal is amplified based on the digital gain value. The amplification can be at the gain control amplifier. The amplified output signal can be provided to a read channel device for processing of the data on the magnetic disk.

What have been described above are examples of the invention. It is, of course, not possible to describe every conceivable combination of components or methodologies for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. A preamplifier system for a magnetic disk-drive, the system comprising:
   a read amplifier configured to generate a read signal corresponding to data that is read from a magnetic disk via a magneto-resistive (MR) read head;
   a gain control amplifier that is configured to amplify the read signal based on a digital gain value to generate an amplified read signal; and
   a feed-forward automatic gain controller (AGC) configured to set the digital gain value based on an amplitude of the read signal.

2. The system of claim 1, wherein the feed-forward AGC comprises a full-wave detector configured to generate a peak-amplitude signal associated with the magnitude of the read signal.

3. The system of claim 2, wherein the feed-forward AGC further comprises:
   a low-pass filter (LPF) configured to generate a filtered version of the peak-amplitude signal having gradual magnitude transitions in response to magnitude transitions of the peak-amplitude signal; and
   a level comparator configured to generate the digital gain value based on an amplitude of the filtered version of the peak-amplitude signal.

4. The system of claim 1, wherein the feed-forward AGC further comprises a latch circuit configured to latch the digital gain value to the gain control amplifier at a conclusion of an automatic gain control calculation period.

5. The system of claim 4, wherein the automatic gain control calculation period is based on a timing signal that is provided to the feed-forward AGC.

6. The system of claim 5, wherein the timing signal is a digital signal configured to initiate the automatic gain control calculation period at a transition to a first state and to latch the current value of the digital gain value to the gain control amplifier at a transition to a second state.

7. The system of claim 6, wherein the timing signal is provided to the feed-forward AGC to activate the feed-forward AGC based on the transition to the first state to initiate the automatic gain control calculation period.

8. The system of claim 1, wherein the read amplifier is one of a plurality of read amplifiers, the system further comprising a multiplexer configured to provide the read signal from one of the plurality of read amplifiers.

9. The system of claim 1, wherein the gain control amplifier and the feed-forward AGC are configured as a first gain stage, the system comprising a plurality of sequential gain stages that each comprise a respective gain control amplifier and a respective feed-forward AGC, each of the plurality of sequential gain stages after the first gain stage being configured to amplify an amplified read signal that is provided from a preceding gain stage.

10. The system of claim 1, wherein the feed-forward AGC is configured to latch the digital gain value to the gain control amplifier based on filtering a peak-amplitude of the read signal during an automatic gain control calculation period.

11. A method for controlling gain of a preamplifier system, the method comprising:
- initiating an automatic gain control calculation period;
- reading a data signal from a magnetic disk via a magneto-resistive read head;
- determining a peak-amplitude of the data signal throughout the automatic gain control calculation period;
- setting a digital gain value for a gain control amplifier at a conclusion of the automatic gain control calculation period based on the determined peak-amplitude of the data signal; and
- amplifying the data signal based on the digital gain value.

12. The method of claim 11, wherein setting the digital gain value comprises filtering the peak-amplitude of the data signal to provide a filtered signal having gradual transitions of the peak-amplitude of the data signal.

13. The method of claim 12, wherein setting the digital gain value further comprises latching digital gain value based on a magnitude of the filtered signal at the conclusion of the automatic gain control period.

14. The method of claim 11, wherein initiating the automatic gain control calculation period comprises changing a logic-state of a timing signal to a first state, and wherein setting the digital gain value comprises latching the digital gain value in response to a transition of the timing signal to a second state.

15. The method of claim 11, wherein setting the digital gain value comprises setting a first digital gain value for a first gain control amplifier at the conclusion of a first automatic gain control calculation period, and wherein amplifying the data signal comprises amplifying the data signal to generate an amplified output signal, the method further comprising:
- determining a peak-amplitude of the amplified output signal throughout a second automatic gain control calculation period;
- setting a second digital gain value for a second gain control amplifier at a conclusion of the second automatic gain control calculation period based on the determined peak-amplitude of the amplified output signal; and
- amplifying the amplified output signal based on the second digital gain value.

16. The method of claim 11, wherein reading the data signal comprises:
- reading a plurality of data signals from the magnetic disk; and
- selecting one of the plurality of data signals to be provided to the gain control amplifier via a multiplexer.

17. A preamplifier system for a magnetic disk-drive, the system comprising:
- means for reading a data signal from a magnetic disk;
- means for amplifying the data signal based on a digital gain value to generate an amplified data signal; and
- means for setting the digital gain value based on an amplitude of the data signal.

18. The system of claim 17, wherein the means for setting the digital gain value comprises means for generating a peak-amplitude signal associated with the magnitude of the data signal.

19. The system of claim 18, wherein the means for setting the digital gain value further comprises:
- means for filtering the peak-amplitude signal to provide gradual magnitude transitions in response to magnitude transitions of the peak-amplitude signal; and
- means for converting the peak-amplitude signal to the digital gain value.

20. The system of claim 19, wherein the means for setting the digital gain value comprises a means for latching the digital gain value at a conclusion of an automatic gain control calculation period.

21. An automatic gain control system comprising:
- a gain control amplifier that is configured to amplify an analog data signal based on a digital gain value to generate an amplified analog data signal; and
- a feed-forward automatic gain controller (AGC) configured to set the digital gain value, the feed-forward AGC comprising:
  - a full-wave detector configured to generate a peak-amplitude signal associated with the magnitude of the analog data signal;
  - a low-pass filter (LPF) configured to generate a filtered version of the peak-amplitude signal having gradual magnitude transitions in response to magnitude transitions of the peak-amplitude signal; and
  - a latch circuit configured to latch the digital gain value to the gain control amplifier based on an amplitude of the filtered version of the peak-amplitude signal.

22. The system of claim 21, wherein the latch circuit is configured to latch the digital gain value at a conclusion of an automatic gain control calculation period.

23. The system of claim 22, wherein the automatic gain control calculation period is based on a timing signal that is provided to the feed-forward AGC.

24. The system of claim 23, wherein the timing signal is a digital signal configured to initiate the automatic gain control calculation period at a transition to a first state and to latch the current value of the digital gain value to the gain control amplifier at a transition to a second state.

25. The system of claim 21, wherein the feed-forward AGC further comprises a level comparator configured to generate the digital gain value based on an amplitude of the filtered version of the peak-amplitude signal relative to a plurality of thresholds.

26. The system of claim 21, wherein the gain control amplifier and the feed-forward AGC are configured as a first gain stage, the system comprising a plurality of sequential gain stages that each comprise a respective gain control amplifier and a respective feed-forward AGC, each of the plurality of sequential gain stages after the first gain stage being configured to amplify an amplified analog data signal that is provided from a preceding gain stage.

27. A preamplifier system for a magnetic disk-drive comprising the automatic gain control system of claim 21.

* * * * *